(12) United States Patent
Schwarzwalder et al.

(10) Patent No.: US 11,581,618 B2
(45) Date of Patent: Feb. 14, 2023

(54) THERMOMECHANICAL FUSES FOR HEAT PROPAGATION MITIGATION OF ELECTROCHEMICAL DEVICES

(71) Applicant: GM Global Technology Operations LLC, Detroit, MI (US)

(72) Inventors: Holly C. Schwarzwalder, Hazel Park, MI (US); Adam J. Tallman, Shelby Township, MI (US); Zachary S. Mendla, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 239 days.

(21) Appl. No.: 16/951,167

(22) Filed: Nov. 18, 2020

(65) Prior Publication Data

US 2022/0158149 A1     May 19, 2022

(51) Int. Cl.
*H01M 50/581*     (2021.01)
*H01M 10/613*     (2014.01)
(Continued)

(52) U.S. Cl.
CPC .......... *H01M 50/581* (2021.01); *B60L 50/64* (2019.02); *H01M 10/613* (2015.04); *H01M 10/625* (2015.04); *H01M 10/6554* (2015.04); *H01M 50/20* (2021.01); *B60K 6/28* (2013.01); *B60Y 2200/91* (2013.01); *B60Y 2200/92* (2013.01); *H01M 2200/103* (2013.01); *H01M 2220/20* (2013.01)

(58) Field of Classification Search
CPC ............. H01M 50/581; H01M 10/613; H01M 10/625; H01M 50/20; H01M 2220/20; B60L 50/64; B60L 3/0046; B60K 1/04
See application file for complete search history.

(56) References Cited

U.S. PATENT DOCUMENTS 5,644,282 A * 7/1997 Mehta ................. H01M 50/572
429/7
6,103,075 A    8/2000 Winsel et al.
(Continued)

FOREIGN PATENT DOCUMENTS

DE     102016120165 A1    5/2017
WO        2020013120 A1    8/2021

*Primary Examiner* — Stewart A Fraser
(74) *Attorney, Agent, or Firm* — Quinn IP Law

(57) ABSTRACT

Presented are thermomechanical fuses for mitigating heat propagation across electrochemical devices, methods for making and methods for using such fuses, and traction battery packs with load-bearing, sacrificial thermomechanical fuses to help prevent thermal runaway conditions. A battery assembly includes an electrically insulating battery housing with multiple battery cells disposed inside the battery housing. These battery cells are electrically interconnected, in series or parallel, and stacked in side-by-side facing relation to form adjacent, mutually parallel stacks of battery cells. Thermomechanical fuses thermally connect neighboring stacks of the battery cells. Each thermomechanical fuse is formed, in whole or in part, from a dielectric material that undergoes deterioration or deformation at a predefined critical temperature; in so doing, the thermomechanical fuse thermally disconnects a first stack of cells from a neighboring second stack of cells.

20 Claims, 6 Drawing Sheets

(51) Int. Cl.
*H01M 10/6554* (2014.01)
*H01M 10/625* (2014.01)
*B60L 50/64* (2019.01)
*H01M 50/20* (2021.01)
*B60K 6/28* (2007.10)

(56) References Cited

U.S. PATENT DOCUMENTS

| | | |
|---|---|---|
| 6,639,385 B2 | 10/2003 | Verbrugge et al. |
| 6,641,942 B1 | 11/2003 | Rouillard et al. |
| 7,109,685 B2 | 9/2006 | Tate, Jr. et al. |
| 7,324,902 B2 | 1/2008 | Verbrugge et al. |
| 7,373,264 B2 | 5/2008 | Verbrugge et al. |
| 7,612,532 B2 | 11/2009 | Verbrugge |
| 7,768,233 B2 | 8/2010 | Lin et al. |
| 7,928,690 B2 | 4/2011 | Koch et al. |
| 8,035,986 B2 | 10/2011 | Koetting et al. |
| 8,054,046 B2 | 11/2011 | Lin et al. |
| 8,059,404 B2 | 11/2011 | Miller et al. |
| 8,108,160 B2 | 1/2012 | Liu et al. |
| 8,170,818 B2 | 5/2012 | Lin et al. |
| 8,198,864 B2 | 6/2012 | Koch et al. |
| 8,212,519 B2 | 7/2012 | Koch et al. |
| 8,321,164 B2 | 11/2012 | Liu et al. |
| 8,581,543 B2 | 11/2013 | Koch et al. |
| 8,645,088 B2 | 2/2014 | Schaefer et al. |
| 8,836,280 B2 | 9/2014 | Koch et al. |
| 8,861,202 B2 | 10/2014 | Nassoiy |
| 9,172,118 B2 | 10/2015 | Marsh et al. |
| 9,176,194 B2 | 11/2015 | Meisner et al. |
| 9,178,192 B2 | 11/2015 | Payne |
| 9,337,484 B2 | 5/2016 | Verbrugge et al. |
| 9,354,277 B2 | 5/2016 | Lin et al. |
| 9,461,490 B2 | 10/2016 | Ying |
| 9,513,338 B2 | 12/2016 | Koch et al. |
| 10,431,411 B2 | 10/2019 | Fernandez et al. |
| 10,559,805 B2 | 2/2020 | Jones et al. |
| 2005/0266279 A1* | 12/2005 | Kim .......... H01M 50/581 429/57 |
| 2011/0244293 A1 | 10/2011 | Khalighi et al. |
| 2011/0309838 A1 | 12/2011 | Lin et al. |
| 2012/0087091 A1 | 4/2012 | Nassoiy |
| 2014/0297084 A1 | 10/2014 | Meisner et al. |
| 2015/0017508 A1 | 1/2015 | Khakhalev |
| 2015/0162571 A1 | 6/2015 | Ogg et al. |
| 2015/0301116 A1 | 10/2015 | Baker et al. |
| 2015/0318502 A1 | 11/2015 | Kanai |
| 2016/0039419 A1 | 2/2016 | Wampler et al. |
| 2016/0077160 A1 | 3/2016 | Wampler, II et al. |
| 2016/0254562 A1 | 9/2016 | Morris-Cohen et al. |
| 2016/0259011 A1 | 9/2016 | Joe |
| 2016/0293991 A1 | 10/2016 | Goeltz et al. |
| 2016/0336552 A1 | 11/2016 | MacLean et al. |
| 2016/0372777 A1 | 12/2016 | Buckley et al. |
| 2017/0077507 A1 | 3/2017 | Harada et al. |
| 2018/0205125 A1 | 7/2018 | Burgers et al. |
| 2018/0375132 A1 | 12/2018 | Li et al. |
| 2019/0051956 A1 | 2/2019 | Jeon et al. |
| 2019/0126770 A1 | 5/2019 | Koch et al. |
| 2019/0148696 A1 | 5/2019 | Kaye et al. |
| 2019/0157710 A1 | 5/2019 | Makino et al. |
| 2019/0159347 A1 | 5/2019 | Ito et al. |
| 2019/0357386 A1 | 11/2019 | Coppola et al. |
| 2020/0295336 A1 | 9/2020 | Tallman et al. |

\* cited by examiner

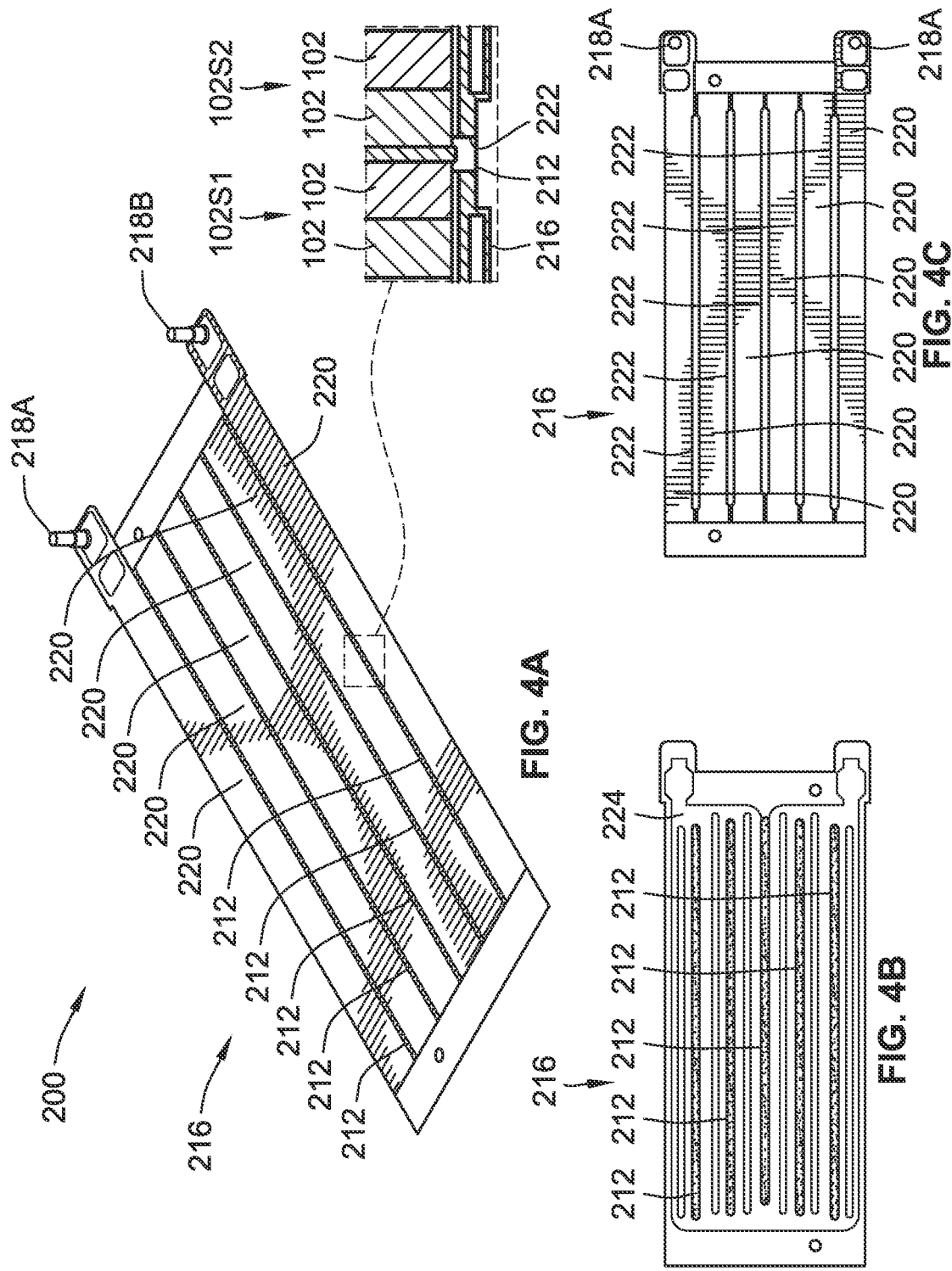

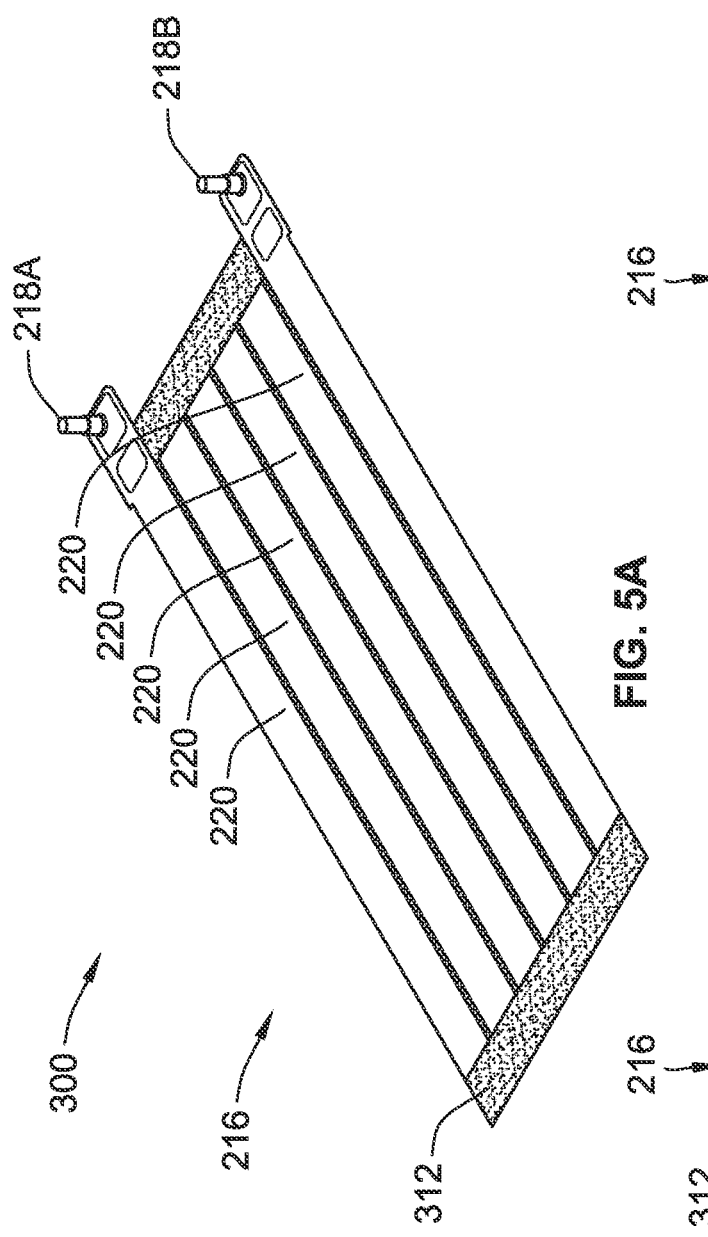
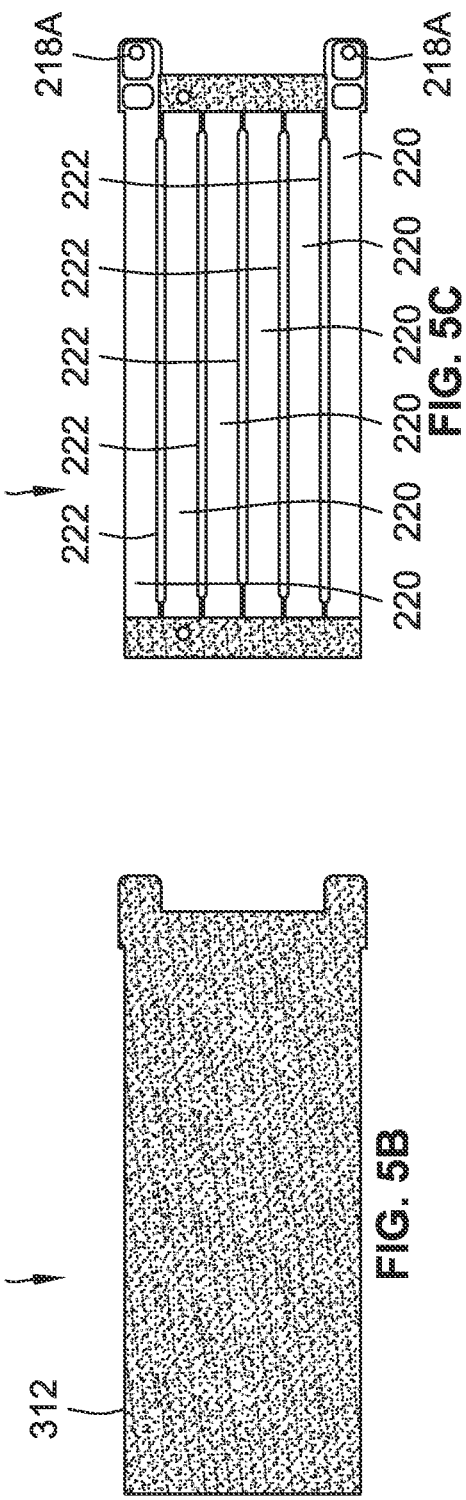
FIG. 5A
FIG. 5B
FIG. 5C

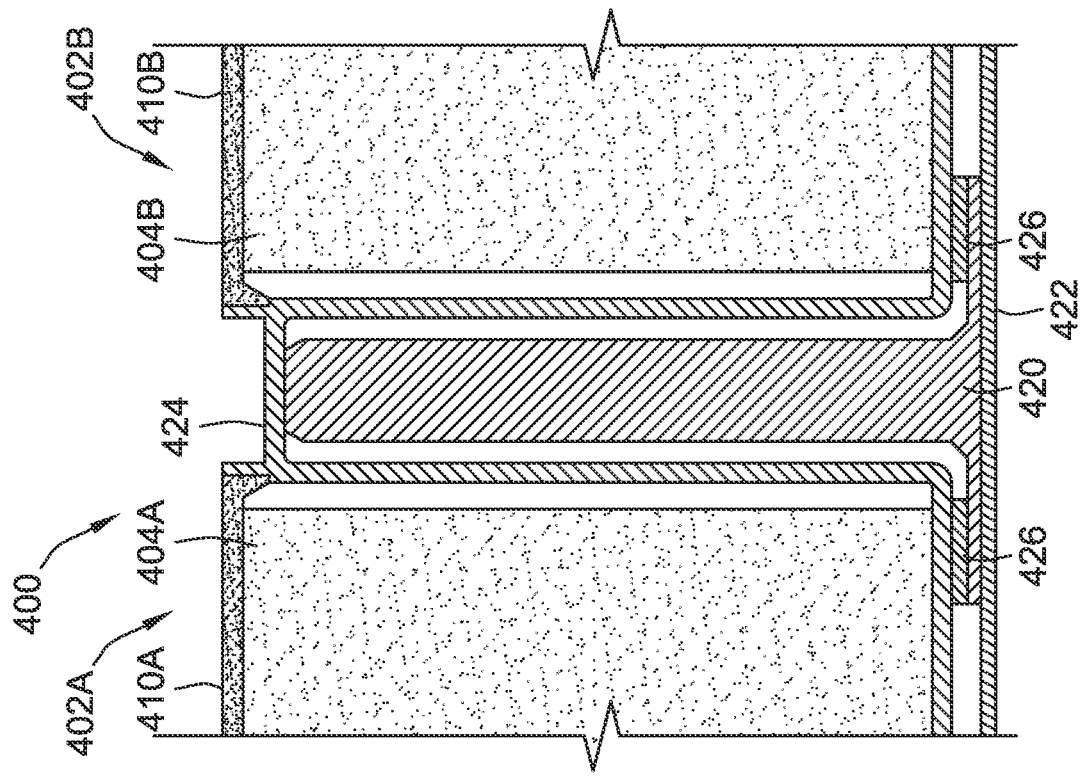
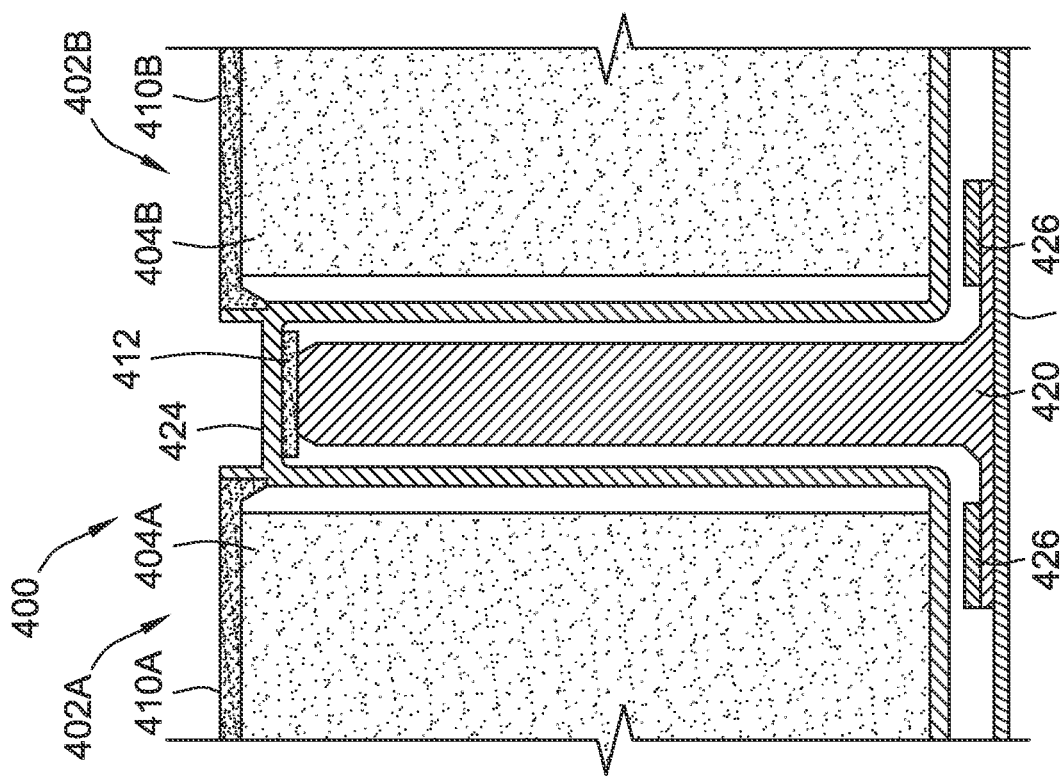

THERMOMECHANICAL FUSES FOR HEAT PROPAGATION MITIGATION OF ELECTROCHEMICAL DEVICES

INTRODUCTION

The present disclosure relates generally to electrochemical devices. More specifically, aspects of this disclosure relate to thermal management features for mitigating heat propagation of rechargeable traction battery packs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits an internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of battery cells into individual battery modules, which are then mounted onto the vehicle chassis, e.g., by a battery pack housing or support tray. Stacked electrochemical battery cells may be connected in series or parallel through use of an electrical interconnect board (ICB). In this instance, the electrical tabs of the battery cells project out from the module housing, are bent against, and then welded to shared busbar plates. A dedicated Battery Pack Control Module (BPCM), through collaborative operation with a Powertrain Control Module (PCM), regulates the opening and closing of battery pack contactors to govern operation of the battery pack for powering the vehicle's traction motor(s).

During HEV and FEV operation—including both vehicle propulsion and vehicle charging processes—heat propagation within the vehicle's high-voltage (HV) electrical system amplifies in relation to the increase electric current being transferred to or through the vehicle. As power transfer increases, the amount of heat produced in the power electronics package, battery cells, electrical cables, and busbars drastically escalates. Temperature is one of the most significant factors affecting the performance and operational life of a battery. Extreme ambient temperatures and hardware abuse conditions, such as manufacturing defects, overcharge/over-discharge, physical deformation, short circuit, etc., may adversely affect the battery's ability to function properly and, in severe cases, may permanently damage the battery. A thermal event may transpire in which the battery exceeds a critical onset temperature at which an exothermic side reaction occurs during electrochemical energy generation. At the same time, the battery may maintain the heat of reaction associated with sustaining this exothermic reaction, which in turn accelerates the reaction kinetics, leading to a cyclical increase in heat output. If this self-accelerated thermal event is left unchecked, heat development may develop into a "thermal runaway" condition; once initiated, the battery's cooling system may be unable to ameliorate the thermal runaway condition.

SUMMARY

Presented herein are thermomechanical fuses for mitigating heat propagation of electrochemical devices, methods for making and methods for using such fuses, and traction battery packs with load-bearing, sacrificial thermomechanical fuses that mitigate thermal runaway conditions. By way of example, and not limitation, there are presented thermally conductive, mechanically interconnecting elements that act as both a structural member and a thermal member; upon thermal runaway, these thermomechanical elements disintegrate or otherwise open to thereby eliminate or "short circuit" a thermal pathway between adjacent components. Under normal operating conditions, a sacrificial thermomechanical fuse may act as part of the battery housing's support structure that enables normal battery performance. For instance, the fuse material may be inlaid into vent slots in the cooling plate of the battery module housing, may be overmolded onto the cooling plate, or may be interposed between inter-module connecting tabs and module-buttressing crossmembers of the housing. Under thermal runaway conditions, the elevated temperature causes the fuse material to melt, disintegrate, deform, or open to prevent further thermal propagation. The fuse material, when dissolved, may also function to open vent pathways for convective heat transfer.

Aspects of this disclosure are directed to electrochemical devices with thermomechanical fuses for mitigating inadvertent heat propagation. In an example, a rechargeable battery pack assembly includes an electrically insulated, protective outer housing with multiple battery cells disposed inside the battery housing. These battery cells are electrically interconnected, in series and/or in parallel, and stacked together to form multiple neighboring stacks of battery cells. One or more thermomechanical fuses thermally connect the neighboring stacks of battery cells and/or thermally seal the housing. Each thermomechanical fuse is formed, in whole or in part, from a dielectric material that is designed to undergo deterioration or deformation (e.g., melt, decompose, disintegrate, detach, buckle, bend, etc.) at a predefined critical temperature. In so doing, the thermomechanical fuse thermally disconnects one or more pairs of neighboring cell stacks.

Additional aspects of this disclosure are directed to electric-drive vehicles equipped with rechargeable battery packs that utilize load-bearing, sacrificial thermomechanical fuses to help prevent thermal runaway conditions. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, e-bikes, e-scooters, etc. For non-automotive applications, disclosed concepts may be implemented for any logically relevant use, including stand-alone power stations and portable power packs, photovoltaic systems, electronic devices, pumping equipment, machine tools, appliances, etc. In an example, a motor vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above example, the electric-drive vehicle also includes at least one rechargeable traction battery pack that is mounted onto the vehicle body and operable to power the vehicle powertrain's traction motor(s). The traction battery pack includes an electrically insulated and weather resistant protective outer housing, and multiple battery cells stored inside the battery housing. These battery cells are electrically connected to each other and stacked, e.g., in side-by-side facing relation, to form at least a first stack of cells that is parallel to and neighboring a second stack of cells. A thermomechanical fuse thermally connects the first stack of battery cells to the second stack of battery cells and/or thermally seals one or more vents in the protective outer housing. This thermomechanical fuse is formed, in whole or in part, from a dielectric material that undergoes deterioration or deformation at a predefined critical temperature to thereby thermally disconnect the first cell stack from the second cell stack.

Aspects of this disclosure are also directed to methods for making and methods for using any of the disclosed thermal fuses, electrochemical devices, and/or motor vehicles. In an example, a method is presented for manufacturing a battery assembly. This representative method includes, in any order and in any combination with any of the above and below disclosed options and features: assembling a battery housing; stacking a plurality of battery cells into first and second stacks of cells; placing the first and second stacks of cells inside the battery housing; and attaching a thermomechanical fuse to the battery housing to thermally connect the first and second stacks of cells and/or thermally seal the battery housing, the thermomechanical fuse including a dielectric material configured to undergo deterioration and/or deformation at a predefined critical temperature, e.g., to thermally disconnect the first and second cell stacks and/or thermally unseal the battery housing.

For any of the disclosed fuses, methods, devices, and vehicles, the battery housing includes a cooling plate that supports thereon the battery cells. In this instance, the thermomechanical fuse or fuses is/are mounted to the cooling plate. Moreover, each thermomechanical fuse may at least partially support thereon the first and second stacks of cells. As a further option, the cooling plate may define therethrough an elongated slot that is located between the first and second stacks of cells. In this instance, the thermomechanical fuse is mounted within the elongated slot. The thermomechanical fuse may substantially or completely fill the elongated slot. Moreover, the thermomechanical fuse may extend through and interference fit into the elongated slot. The thermomechanical fuse may be inlaid into the elongated slot such that the fuse is substantially flush with opposing inner and outer faces of the cooling plate.

For any of the disclosed fuses, methods, devices, and vehicles, the thermomechanical fuse may be overmolded onto and cover at least an exterior face of the cooling plate. In this instance, the thermomechanical fuse may also cover an interior face of the cooling plate opposite the exterior face. As yet a further option, the cooling plate may define therethrough a series of mutually parallel, elongated slots. In this instance, the thermomechanical fuse includes a series of mutually parallel, elongated thermomechanical fuses, each of which is mounted within a respective one of the elongated slots.

For any of the disclosed fuses, methods, devices, and vehicles, the first and second stacks of cells are located within first and second module housings, respectively. In this instance, the battery housing includes a support beam that is mounted at a proximal end thereof to a support tray. The thermomechanical fuse may be mounted on a distal end of the support beam, interposed between the support beam and a housing tab that connects the neighboring module housings. As yet a further option, the predefined critical temperature that causes deterioration/deformation of the fuse is at least about 100 degrees Celsius (° C.). The dielectric material may include a polymeric material that undergoes thermal decomposition or disintegration at the predefined critical temperature.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 4A to 4C are perspective view, bottom view, and plan view illustrations, respectively, of a representative battery housing cooling plate with a series of inlaid thermomechanical fuses in accord with aspects of the disclosed concepts.

FIGS. 5A to 5C are perspective view, bottom view, and plan view illustrations, respectively, of another representative battery housing cooling plate with an overmolded thermomechanical fuse in accord with aspects of the disclosed concepts.

FIGS. 6A and 6B schematic side-view illustrations of a representative battery housing with a thermomechanical fuse interposed between an inter-module connecting tab and a housing crossmember in accord with aspects of the disclosed concepts.

Figure 1:
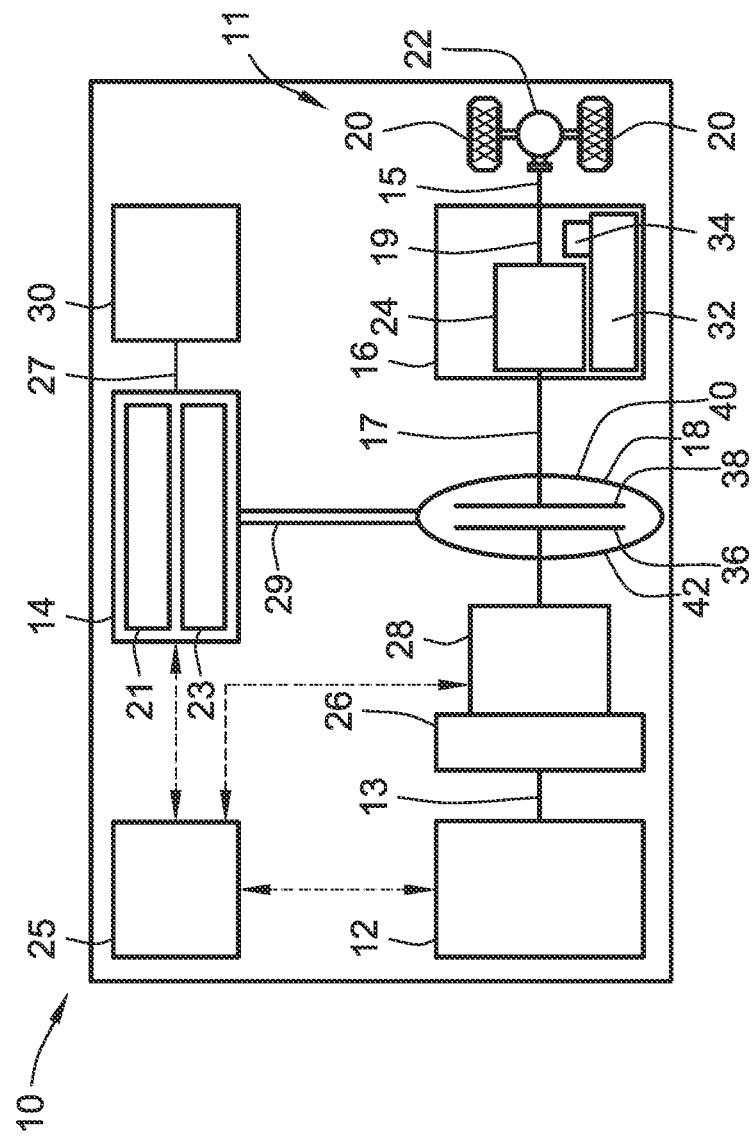
FIG. 1 is a schematic illustration of a representative vehicle with an electrified powertrain employing an electric traction motor that is powered by a rechargeable traction battery pack with thermomechanical fuses in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein. Nevertheless, the vehicles, devices, and fuses discussed below may include numerous additional and alternative features, and other available peripheral components and hardware, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13 (also referred to herein as "engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of the torque converter (TC) assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for the supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 (also referred to herein as "motor output member") to the hydrodynamic torque converter 18. The torque converter 18, in turn, drivingly connects the motor 14 to an input shaft 17 ("transmission input member") of the transmission 16. The electric motor/generator unit 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture, the vehicle 10 may employ other HEV powertrain configurations, including P0, P1, P2.5, P3 and P4 configurations, or may be adapted for a BEV, PHEV, fuel-cell hybrid vehicle, FEVs, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrodynamic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in facing serial power-flow fluid communication with the turbine 38, with a stator (not shown) interposed between the impeller 36 and turbine 38 to selectively alter fluid flow therebetween. The transfer of torque from the engine output members 13 and motor output member 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the TC assembly 18 is constructed with a TC pump housing, defined principally by a transmission-side pump shell 40 fixedly attached to an engine-side pump cover 42 such that a working hydraulic fluid chamber is formed therebetween.

Figure 2:
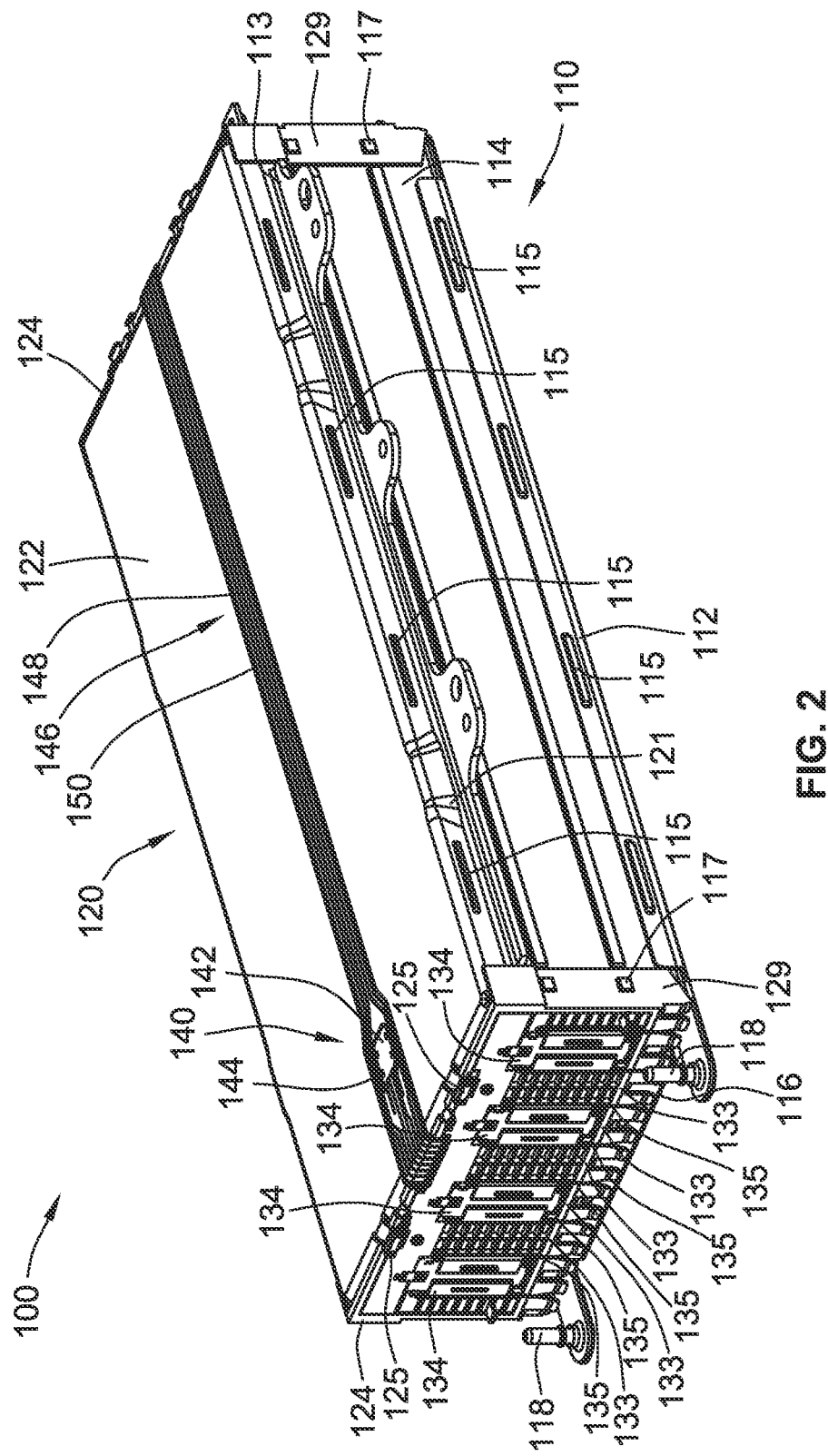
FIG. 2 is a perspective view illustration of a representative battery module with internally packaged stacks of battery cells that are thermally and structurally interconnected via thermomechanical fuses in accordance with aspects of the present disclosure.

Turning next to FIG. 2, there is shown a segment of a rechargeable energy storage system (RESS) that is adapted for storing and supplying electrical energy used, for example, to propel an electric-drive vehicle, such as P2 HEV 10 of FIG. 1. This RESS may be a deep-cycle, high-ampere capacity vehicle battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as battery pack 30 of FIG. 1, for powering one or more polyphase permanent magnet (PM) electric machines, such as traction motor 14. Each battery pack incorporates an aggregation (e.g., 100's or 1000's) of discrete electrochemical cells connected in series and/or parallel to achieve desired voltage and current requirements.

Figure 3:
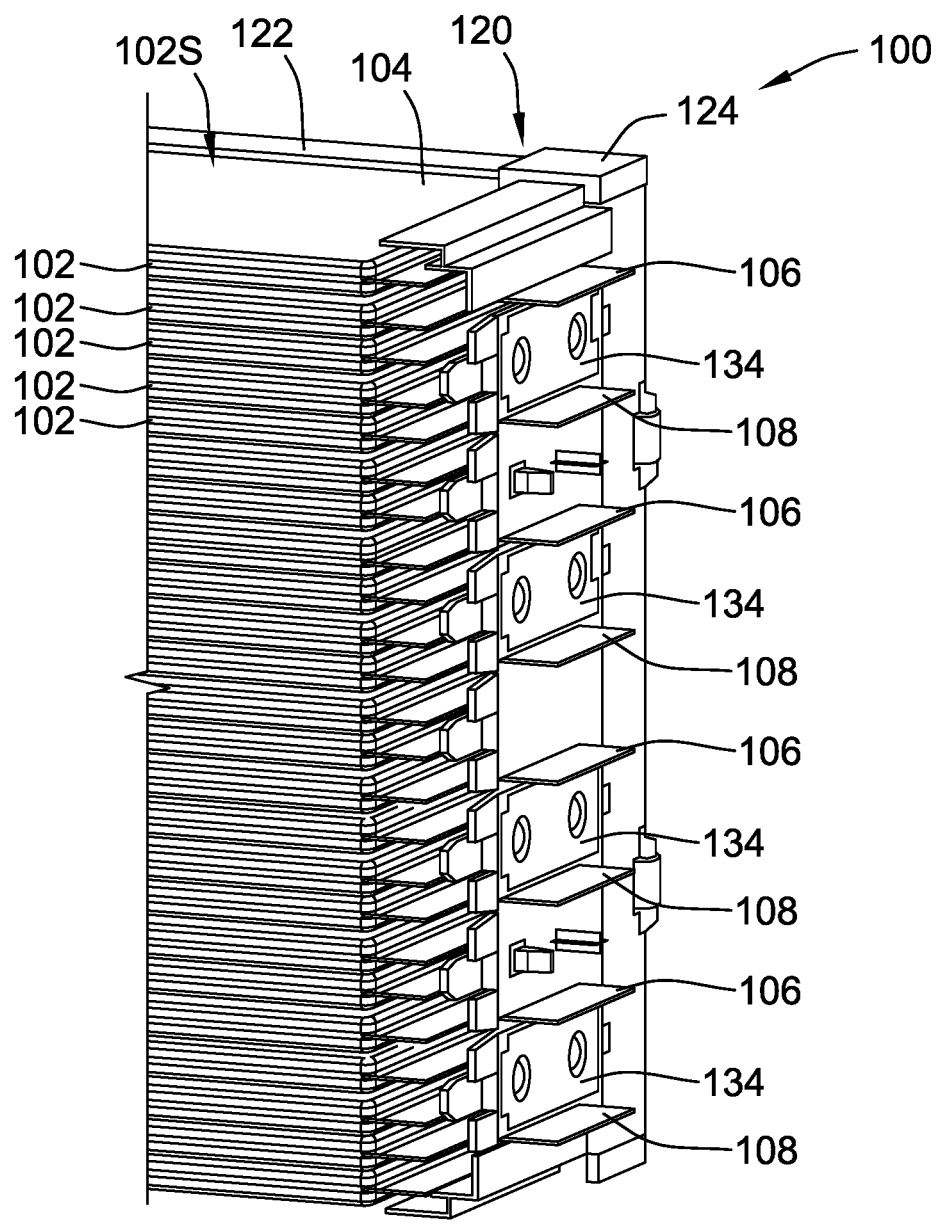
FIG. 3 is a perspective view illustration of the representative battery module of FIG. 2 with the module's base plate, cooling plate, and sidewalls removed to better illustrate the internally packaged stacks of battery pouch cells.

A traction battery pack is generally composed of an array of lithium-ion battery modules, an example of which is illustrated at 100 in FIGS. 2 and 3. These battery modules 100 may be buttressed on a battery support tray or other body panel that provides subjacent support for the battery pack during vehicle operation. Aspects of the disclosed concepts may be similarly applicable to other electric storage unit architectures, including those employing nickel metal hydride (NiMH) batteries, lead acid batteries, lithium polymer batteries, or other applicable type of rechargeable secondary battery. Each battery module 100 may include a stack 102S of electrochemical battery cells, such as pouch-type lithium ion (Li-ion) or Li-ion polymer (LiPo) battery pouch cells 102 of FIG. 3, for example. For simplification of design and maintenance, and for reduction in cost and assembly time, each battery module 100 in the RESS may be substantially identical to one another.

An individual lithium-ion battery module 100 may be typified by multiple battery cells 102 (e.g., 20-30) that are stacked in side-by-side facing relation and connected in parallel or in series for storing and supplying electrical energy. A battery cell may be a multi-layer construction that is provided with an outer battery casing, which is represented in the drawings by an envelope-like pouch 104 (FIG. 3). The respective sides of the pouch 104 may be formed of polymer foam, insulated aluminum sheet metal, or other suitable material. These two sides are connected, e.g., via welding or crimping, to generally enclose therein an electrolyte composition that conducts positive Lithium ions between working electrodes. Extending outwardly from opposing longitudinal ends of the pouch 104 are positive (cathode) and negative (anode) electrical terminals ("tabs") 106 and 108, respectively, for making electrical connections with positive and negative electrodes (not visible) packaged within the internal volume of pouch 104. While shown as a silicon-based, Li-ion "pouch cell" battery, the battery cells 102 may be adapted to other constructions, including cylindrical and prismatic constructions.

With collective reference to FIGS. 2 and 3, the battery module 100 stores the electrochemical battery cells 102 inside a protective, electrically insulating battery module housing 110. Battery module housing 110 may be a rigid, multi-part construction assembled from a housing base 112 and a pair of module sidewalls 114 that project orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, both formed from a rigid plastic material with snap fastener projections 115 and 117 for operatively aligning and mechanically connecting the sidewalls 114 with complementary segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in FIG. 2) that pass therethrough a coolant fluid received via coolant ports 118. The module sidewalls 114 and cooling plate 116 may be mechanically attached and fluidly sealed to the housing base 112, e.g., via snap fasteners and a seal-forming foam. It is envisioned that the battery module housing 110 may take on other sizes and shapes to accommodate alternative applications with different packaging and design constraints. In the same vein, the module housing 110 may be assembled from greater or fewer segments than that which are shown in the drawings; alternatively, the housing 110 may be molded and machined as a single-piece or bipartite, unitary structure.

Operatively aligning and electrically interconnecting the battery cells 102 is an integrated interconnect board (ICB) assembly 120 that is mounted on top of the battery module housing 110. In accord with the illustrated example, the ICB assembly 120 provides a protective outer jacket that is generally defined by a central cover 122 with a pair of flanged endwalls 124 that project generally orthogonally from opposing ends of the central cover 122. The central cover 122 is formed from a rigid polymeric material with integral lateral flanges 121 having elongated snap fastener slots, which receive therein snap fastener projections 115 of the housing sidewalls 114. A pair of snap-in hooks 125 projects from each longitudinal end of the cover 122 and receives therein mounting pivot pins (not labelled) of the ICB endwalls 124. ICB assembly endwalls 124 may be structurally identical, both formed from a rigid polymeric material that is similar to or distinct from the polymeric material used to fabricate the ICB cover 122. Each endwall 124 is fabricated with integral mounting flanges 129 that have snap fastener holes, which receive therein snap fastener projections 117 of the housing sidewalls 114.

Bottom ends of each of the ICB assembly endwalls 124 are segmented into a series of elongated, mutually parallel endwall plates 133 that are arranged side-by-side in a vertical column-like fashion. These endwall plates 133 interleave with and are separated from one another by elongated slots 135. Each endwall plate 133 is integrally formed with a succession of flexible snap fastener tabs (not labelled) that project downwardly from a bottom edge of the endwall 124. These tabs slidably engage with and press-fit onto the cooling plate 116; in so doing, the ICB assembly 120 mechanically attaches to the remainder of the battery module housing 110. In the illustrated embodiment, the ICB assembly 120 may be hermetically sealed to the module housing 110.

After mounting the integrated ICB assembly 120, the electrical tabs 106, 108 of the battery cells 102 are electrically connected to electrical busbar plates 134 mounted on the exterior faces of the ICB endwalls 124. As shown, each busbar plate 134 is fabricated from an electrically conductive material (e.g., aluminum or copper) that is fashioned into a generally rectangular panel, which is then mounted on an exterior surface of an endwall 124, e.g., via mounting tabs, adhesives, and/or fasteners. Likewise, the battery cell tabs 106, 108 are also fabricated from electrically conductive materials (e.g., Al and Cu) and bent into L-shaped terminals, an exterior portion of which lays flush again and solders, welds, or clips to one of the busbar plates 134. L-shaped inter-module bussing brackets (not labelled) are mounted on the ICB endwalls 124 to electrically connect the battery module 100 to adjacent battery modules.

In addition to providing a protective jacket and electrically interconnecting the battery cells 102, the ICB assembly 120 also provides sensing, operating, and electrical isolation functionalities. Such functionality may be provided by an integrated circuit (IC) sensing assembly 140 that may be mounted on the central cover 122. The IC sensing assembly 140 is fabricated with multiple sensing devices 142, such as current, voltage, and/or temperature sensors, which are operable to sense operational characteristics of the battery cells 102. A flexible printed circuit board (PCB) 144 is shown mounted on the central cover 122, supporting thereon the sensing devices 142. A flexible electrical track 146 with multiple electrical traces 148 borne by an electrically insulating track sheet 150 electrically connects the flexible PCB 144 and, thus, the sensing devices 142 to the battery cells 102 via the busbar plates 134.

The operational life expectancy and performance of a rechargeable energy storage system may be improved by controlling system exposure to extreme temperatures, both high and low. During operation of the vehicle 10 of FIG. 1, for example, it is desirable to minimize or eliminate impetuses that effect a thermal runaway event in the vehicle's traction battery pack 30. The rechargeable energy storage systems described herein include features that help to reduce thermal runaway while preserving cooling performance of the RES S's thermal management system and maintaining charge/discharge performance of the energy storage system. For example, use of the features described below may reduce thermal runaway of the traction battery pack 30 of FIG. 1 or the battery module 100 of FIGS. 2 and 3 during the following example operations, such as direct-current fast charging (DCFC), electromagnetic induction wireless charging, powering of an electrified powertrain post vehicle hot soak, inadvertent electrical interruption of the battery pack, etc.

To break the cycle of thermal propagation and accelerated exothermic reaction rates that leads to thermal runaway, the RESS incorporates one or more sacrificial elements that act as both a structural member (e.g., for physically supporting cells or modules) and a thermal member (e.g., for thermally coupling cells or modules). When the RESS reaches a critical temperature that leads to thermal runaway, the sacrificial element responsively deteriorates or deforms (e.g., liquefies, breaks apart, decays, opens, etc.) to eliminate a thermal pathway between the operatively connected cells within a module and/or modules within a pack. An intent of this sacrificial feature is to reduce heat transfer between adjacent components when exposed to a thermal runaway event. FIGS. 4A-4C, FIGS. 5A-5C and FIGS. 6A and 6B illustrate three different examples of load-bearing, sacrificial thermomechanical fuses 212, 312 and 412 for thermally connecting and, when desired, disconnecting neighboring battery cell stacks or neighboring battery modules. Although differing in appearance, it is envisioned that any of the features and options described below with reference to the thermomechanical fuses 212 of FIGS. 4A-4C can be incorporated, singly or in any combination, into the thermomechanical fuses 312 and 412 of FIGS. 5A-5C and FIGS. 6A and 6B, respectively, and vice versa.

Turning first to FIGS. 4A-4C, each thermomechanical fuse 212 is formed, in whole or in part, from an electrically insulating (dielectric) material whose chemical and/or structural composition undergoes deterioration and/or deformation at a predefined critical temperature. For a traction battery pack application, the predefined critical temperature that incites fuse deterioration/deformation is at least about 100° C. or, more particularly, between about 100 and about 400° C. The dielectric material used to fabricate the fuse 212 may include a polymeric material, such as wax-based polymers, Poly(1-butene), isotactic, Polyethylene co methacrylic acids, Poly(trans-1,4-butadiene), that melts at the predefined critical temperature. As yet a further option, the dielectric material may include a polymeric material, such polypropylene and polystyrene, that deforms at the predefined critical temperature, or a polymeric foam, such as rigid polyurethane (PU or polyol), that decomposes at the predefined critical temperature. Another option is tin and similarly malleable yet stable metallic materials with high electrical resistivity. Other materials with low electrical conductivity and a relatively low melting temperature and/or deterioration temperature that aligns with a desired critical temperature are also available for use.

During normal operation of a battery assembly 200, such as battery pack 30 or battery module 100, the transfer of heat generally flows from the stack of battery cells toward a cooling plate 216 that is designed to maintain the respective cell temperatures of the individual battery cells at a uniform "optimal" temperature. Cooling plate 216 of FIGS. 4A-4C, which may be structurally and functionally identical to cooling plate 116 of FIG. 2, provides subjacent support for the internally packaged battery cells of a battery module, such as cells 102 of module 100. During battery charge/discharge, the cooling plate 216 transfers heat away from the stacked cells through forced circulation of a coolant fluid, for example, in a vapor-compression refrigeration cycle. The cooling plate 216 defines a serpentine coolant channel 224 for guiding coolant fluid from a coolant inlet port 218A to a coolant outlet port 218B to thermally transfer heat away from the battery cells. Generally, the fluid flowing through the cooling plate 216 is a liquid coolant, some non-limiting examples of which may include refrigerant, oil, water, water-based ethylene glycol, etc.

Interposed between the stacked battery cells 102 and coolant channel 224 is a series of thermally conductive barrier panels 220 that are applied to the top face of the cooling plate 216. These barrier panels 220 fluidly separate the battery cells from the coolant channel 224 while still allowing for the thermal transfer of heat energy from the cells to the coolant fluid flowing through the channel 224. As shown, the barrier panels 220 are mutually parallel, rectangular-shaped tin slats that extend longitudinally along the length of the cooling plate 216. While shown as discrete panel members, the barrier panels 220 could be fabricated as a single-piece sheet that is mounted onto the cooling plate 216.

In addition to active-type artificial cooling through the use of coolant fluid to regulate heat transfer, the battery module's thermal management system may also employ a series of elongated vent slots 222 (FIGS. 4C and 5C) to enable passive-type convective transfer of thermal energy out of the battery module housing. These vent slots 222 extend through the cooling plate 216 to allow ventilation air to pass through the cooling plate 216 and into the battery module while also allowing heat energy to exhaust through the cooling plate 216 and out from the module. As best seen in FIG. 4C, the vent slots 222 are mutually parallel, elongated openings that extend longitudinally along the length of the cooling plate 216. The vent slots 222 are interleaved with the barrier panels 220 such that an unobstructed path extend through the vent slots 222 to the battery cells. Although shown as discrete, transversely spaced vent slots 222, the cooling plate 216 could be fabricated with a single, continuous vent slot, which may take on a serpentine pattern similar to that of the coolant channel 224.

With continuing reference to FIGS. 4A to 4C, the thermomechanical fuses 212 are rigidly mounted to the cooling plate 216, e.g., at a location underneath the battery cells 102. As seen in the inset view of FIG. 4A, for example, a thermomechanical fuse 212 at least partially supports thereon a first stack 102S1 of battery cells 102 and a second stack 102S2 of battery cells 102 that neighbors and is aligned parallel to the first cell stack 102S1. In this example, each thermomechanical fuse 212 is mounted inside a respective one of the elongated slots 222 extending through the base of the cooling plate 216. As best seen in FIG. 4B, the thermomechanical fuses 212 are mutually parallel, elongated strips that extend longitudinally along the length of the cooling plate 216. Similar to the vent slots 222, the thermomechanical fuses 212 are interleaved with the barrier panels 220. It is envisioned that the thermomechanical fuses 212 may take on other shapes, sizes, and/or locations from that which are shown in the drawings. And similar to the vent slots 222, the thermomechanical fuses 212 may take on both multi-piece and single-piece constructions.

Each thermomechanical fuse 212 substantially or completely fills its respective vent slot 222 to thereby obstruct the ventilation flow paths extending through the cooling plate 216. For at least some implementations, the thermomechanical fuses 212 are inlaid into the elongated vent slots 222 such that they sit substantially flush with one or both opposing faces of the cooling plate 216. Optionally, each thermomechanical fuse 212 may extend through its respective slot 222 and bulge at opposing ends thereof to interference fits into the slot 222. For thermomechanical fuses 212 employing a metallic material, metal working techniques, such as brazing or welding, may be used to affix the fuses 212 to the battery housing. In either of the foregoing examples, a suitable adhesive or overlay may be employed to secure the fuse 212 within the slot 222. During operation of the battery assembly, the thermomechanical fuses 212 may reach a predefined critical temperature, such as during the onset of a thermal runaway event. At this temperature, the fuses 212 deteriorate or deform in a manner sufficient to open ventilation through the vent slots 222 and thereby reduce heat transfer between adjacent battery cell stacks 102S1, 102S2.

FIGS. 5A to 5C present a battery assembly 300 configuration that employs a single-piece thermomechanical fuse 312 structure to help delay or prevent a thermal runaway event. Similar to the thermomechanical fuses 212 of FIGS. 4A to 4C, the thermomechanical fuse 312 is located underneath the battery cells 102 and is rigidly mounted to the cooling plate 216. With this arrangement, the thermomechanical fuse 312 supports thereon and thermally couples the internally packaged stacks of battery cells. In this example, the thermomechanical fuse 312 is laminated, coated, overmolded, or otherwise applied onto and covers both the interior and exterior faces of the cooling plate 216. In so doing, the thermomechanical fuse 312 fills the elongated vent slots 222 in a manner sufficient to obstruct the ventilation flow paths extending through the cooling plate 216. The thermomechanical fuse 312 is formed, in whole or in part, from a dielectric material that melts, decomposes, disintegrates, detaches, buckles, bends, etc., at a predefined critical temperature. In so doing, the thermomechanical fuse 312 thermally disconnects the neighboring cell stacks and opens the vent slots 222.

FIGS. 6A and 6B illustrate a battery assembly 400 with an electrically insulated and weather resistant protective outer battery housing that contains a first battery module 402A adjacent a second battery module 402B. Similar to the module 100 of FIGS. 2 and 3, the battery modules 402A, 402B of FIGS. 6A and 6B each includes a respective module housing 410A and 410B that house therein a stack or stacks 404A and 404B of internally packaged battery cells. The battery housing includes a support beam 420 mounted at a proximal (bottom) end thereof to a support tray 422. A thermomechanical fuse 412 is mounted on a distal (top) end of the support beam 420, interposed between the support beam 420 and a housing tab 424 that connects the first and second module housings 410A, 410B. At a critical temperature, the thermomechanical fuse 412 thermally decomposes such that the housing tab 424 seats directly on top of the support beam 420 and the module housings 410A, 410B seat directly on a pair of landing pads 426. Doing so helps to thermally disconnect the battery modules 402A, 402B.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly, comprising:
a battery housing;
a plurality of battery cells disposed inside the battery housing and stacked together to form a first stack of cells and a second stack of cells; and
a thermomechanical fuse thermally connecting the first and second stacks of cells and/or thermally sealing the battery housing, the thermomechanical fuse including a dielectric material configured to undergo deterioration and/or deformation at a predefined critical temperature and thereby thermally disconnect the first stack of cells from the second stack of cells and/or thermally unseal the battery housing.

2. The battery assembly of claim 1, wherein the battery housing includes a cooling plate supporting thereon the plurality of battery cells, and wherein the thermomechanical fuse is mounted to the cooling plate.

3. The battery assembly of claim 2, wherein the thermomechanical fuse at least partially supports thereon the first and second stacks of cells.

4. The battery assembly of claim 2, wherein the cooling plate defines therethrough an elongated slot located between the first and second stacks of cells, and wherein the thermomechanical fuse is mounted within the elongated slot.

5. The battery assembly of claim 4, wherein the thermomechanical fuse is rigidly secured to the cooling plate and substantially or completely fills the elongated slot.

6. The battery assembly of claim 5, wherein the thermomechanical fuse extends through and interference fits into the elongated slot.

7. The battery assembly of claim 5, wherein the thermomechanical fuse is substantially flush with one or both opposing faces of the cooling plate.

8. The battery assembly of claim 2, wherein the thermomechanical fuse extends across and covers an exterior face of the cooling plate.

9. The battery assembly of claim 8, wherein the thermomechanical fuse extends across and covers an interior face of the cooling plate opposite the exterior face.

10. The battery assembly of claim 2, wherein the cooling plate defines therethrough a series of mutually parallel, elongated slots, and wherein the thermomechanical fuse includes a series of mutually parallel, elongated thermomechanical fuses each mounted within a respective one of the elongated slots.

11. The battery assembly of claim 1, wherein the first and second stacks of cells are located within first and second module housings, respectively, wherein the battery housing includes a support beam mounted at a proximal end thereof to a support tray, and wherein the thermomechanical fuse is mounted on a distal end of the support beam interposed between the support beam and a housing tab connecting the first and second module housings.

12. The battery assembly of claim 1, wherein the predefined critical temperature is at least about 100 degrees Celsius.

13. The battery assembly of claim 1, wherein the dielectric material includes a polymeric material configured to undergo thermal decomposition or disintegration at the predefined critical temperature.

14. An electric-drive motor vehicle, comprising:
a vehicle body with multiple road wheels;
a traction motor mounted on the vehicle body and operable to drive one or more of the road wheels to thereby propel the electric-drive vehicle; and
a traction battery pack mounted on the vehicle body and operable to power the traction motor, the traction battery pack including:
an electrically insulating battery housing;
a plurality of battery cells disposed inside the battery housing, electrically connected to each other, and stacked in side-by-side facing relation to form a first stack of cells parallel to a second stack of cells; and
a thermomechanical fuse thermally connecting the first and second stacks of cells and/or thermally sealing a vent in the battery housing, the thermomechanical fuse including a dielectric material configured to undergo deterioration and/or deformation at a predefined critical temperature and thereby thermally disconnect the first and second stacks of cells and/or thermally unseal the vent.

15. A method for manufacturing a battery assembly, the method comprising:
assembling a battery housing;
stacking a plurality of battery cells into first and second stacks of cells;
placing the first and second stacks of cells inside the battery housing; and
attaching a thermomechanical fuse to the battery housing to thermally connect the first and second stacks of cells and/or thermally seal the battery housing, the thermomechanical fuse including a dielectric material configured to undergo deterioration and/or deformation at a predefined critical temperature and thereby thermally disconnect the first stack of cells from the second stack of cells and/or thermally unseal the battery housing.

16. The method of claim 15, wherein the battery housing includes a cooling plate supporting thereon the plurality of battery cells, wherein the thermomechanical fuse is mounted to the cooling plate, and wherein the thermomechanical fuse at least partially supports thereon the first and second stacks of cells.

17. The method of claim 16, wherein the cooling plate defines therethrough an elongated slot located between the first and second stacks of cells, and wherein the thermomechanical fuse is mounted within the elongated slot.

18. The method of claim 17, wherein the thermomechanical fuse substantially or completely fills the elongated slot.

19. The method of claim 16, thermomechanical fuse extends across and covers an interior face and/or an exterior face of the cooling plate.

20. The method of claim 16, wherein the cooling plate defines therethrough a series of mutually parallel, elongated slots defined through the cooling plate, and wherein the thermomechanical fuse includes a series of mutually parallel, elongated thermomechanical fuses each mounted within a respective one of the elongated slots.

\* \* \* \* \*